(12) United States Patent  (10) Patent No.: US 8,307,701 B2
Laricchiuta                (45) Date of Patent:    Nov. 13, 2012

(54) ENGINE PULLEY TESTING DEVICE

(76) Inventor: Lawrence Andrew Laricchiuta, Farmingville, NY (US)

( * ) Notice: Subject to any disclaimer, the term of this patent is extended or adjusted under 35 U.S.C. 154(b) by 99 days.

(21) Appl. No.: 12/981,087

(22) Filed: Dec. 29, 2010

(65) Prior Publication Data

US 2011/0094322 A1   Apr. 28, 2011

Related U.S. Application Data

(63) Continuation-in-part of application No. 12/544,883, filed on Aug. 20, 2009, now Pat. No. 7,942,045.

(51) Int. Cl.
    *G01M 15/00*   (2006.01)
(52) U.S. Cl. .................................. 73/114.77
(58) Field of Classification Search ............... 73/114.77
    See application file for complete search history.

(56) References Cited

U.S. PATENT DOCUMENTS

| | | |
|---|---|---|
| 434,286 A | 8/1890 | Minot |
| 1,694,670 A | 12/1928 | Richards |
| 3,781,995 A | 1/1974 | Debeaux |
| 3,832,899 A | 9/1974 | Nicolau |
| 4,235,091 A | 11/1980 | Takano et al. |
| 4,480,487 A | 11/1984 | Kunzfeld |
| 5,019,214 A | 5/1991 | Meinecke et al. |
| D319,987 S | 9/1991 | Ueno |
| 5,320,581 A | 6/1994 | Avery |
| 5,336,993 A | 8/1994 | Thomas et al. |
| 5,701,089 A | 12/1997 | Perkins |
| 5,752,891 A | 5/1998 | Meckstroth et al. |
| 5,780,731 A | 7/1998 | Matsui et al. |
| 6,301,978 B1 | 10/2001 | Sargent |
| 7,246,015 B2 | 7/2007 | Bertness et al. |
| 2006/0175484 A1 | 8/2006 | Wood, III et al. |

*Primary Examiner* — Freddie Kirkland, III

(57) ABSTRACT

An engine pulley testing device for detecting damaged engine pulleys featuring a first support arm and a second support arm pivotally connected via a pivot component. Lengths of the support arms are adjustable. A brace component connects the support arms and functions to temporarily secure the support arms a certain distance apart. A pulley pole extends through the pivot component such that the first support arm and second support arm pivot about the pulley pole via the pivot component. A top pulley is disposed on the pulley pole, a first bottom pulley is rotatably attached to the first support arm, and a second bottom pulley is rotatably attached to the second support arm. An engine belt can be wrapped around the first bottom pulley, the second bottom pulley, the top pulley, and a test pulley being tested in an engine.

20 Claims, 12 Drawing Sheets

ENGINE PULLEY TESTING DEVICE

CROSS REFERENCE

This application is a continuation-in-part of U.S. patent application Ser. No. 12/544,883 filed Aug. 20, 2009, the disclosure of which is incorporated herein by reference in its entirety.

FIELD OF THE INVENTION

The present invention is directed to a diagnostic device for automobiles. More particularly, the present invention is directed to a device for detecting worn engine pulleys.

BACKGROUND OF THE INVENTION

Various engine parts include one or more pulleys, all of which are driven by a single belt. With time, the pulleys can begin rattling or squeaking, which can indicate the pulley is deteriorating. However, because a single belt operates all the pulleys, it is difficult to determine which pulley is deteriorating.

The present invention features an engine pulley testing device for allowing a user to detect a damaged engine pulley. The engine pulley testing device comprises a first support arm pivotally connected to a second support arm, a third support arm attached to the first and second support arms via a brace component, and three pulleys. An engine belt can be wrapped around the pulleys.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features an engine pulley testing device for allowing a user to detect a damaged engine pulley. In some embodiments, the engine pulley testing device comprises a first support arm and a second support arm pivotally connected via a pivot component such that the first support arm and second support arm can pivot towards and away from each other; a brace component connecting the first support arm and second support arm, the brace component is temporarily fixed to the first support arm and temporarily fixed to the second support arm via a third locking means, wherein the brace component functions to secure the first support arm and second support arm at an angle theta; a pulley pole extending through pivot component such that the first support arm and second support arm pivot about the pulley pole via the pivot component; and a top pulley disposed on the pulley pole, a first bottom pulley rotatably attached to the first support arm, and a second bottom pulley rotatably attached to the second support arm. An engine belt can be wrapped around the first bottom pulley, the second bottom pulley, the top pulley, and a test pulley being tested in an engine.

In some embodiments, the engine pulley testing device comprises a first support arm and a second support arm pivotally connected via a pivot component such that the first support arm and second support arm can pivot towards and away from each other; a brace component connecting the first support arm and second support arm, the brace component is temporarily fixed to the first support arm and temporarily fixed to the second support arm via a third locking means, the brace component functions to secure the first support arm and second support arm at an angle theta; a third support arm having a first end and a second end, the first end being attached to the pivot component and the second end extending upwardly above the pivot component; a pulley pole disposed on the second end of the third support arm, the pulley pole being generally perpendicular to the third support arm; and a top pulley disposed on the pulley pole, a first bottom pulley rotatably attached to the first support arm, and a second bottom pulley rotatably attached to the second support arm. An engine belt can be wrapped around the first bottom pulley, the tend bottom pulley, the top pulley, and a test pulley being tested in an engine.

The lengths of the first support arm and the second support arm are adjustable. In some embodiments, the first support arm comprises a first inner post telescopically received in a first outer post, wherein the first inner post can be locked in the first outer post via a first locking mechanism. In some embodiments, the second support arm comprises a second inner post telescopically received in a second outer post, wherein the second inner post can be locked in the second outer post via a second locking mechanism.

In some embodiments, the brace component is arc-shaped. In some embodiments, the brace component has a first end and a second end, wherein a slot is disposed therein extending from near the first end of the brace component to near the second end of the brace component and from a front surface of the brace component through to a back surface of the brace component, wherein the brace component is slidably attached to the first support arm via a third screw disposed on the first support arm and extending through the slot, wherein the brace component is slidably attached to the second support arm via a fourth screw disposed on the second support arm and extending through the slot, wherein the third locking means locks the brace component to the first support arm and to the second support arm.

In some embodiments, the engine pulley testing device further comprises a third support arm having a first end and a second end, the first end being attached to the brace component and the second end being attached to the pulley pole. In some embodiments, the engine pulley testing device further comprises a stud disposed on either the first support arm or the second support arm, the stud functions to engage a mechanic's stethoscope.

In some embodiments, a power motor component is disposed on the pulley pole for rotating the pulley pole and top pulley. In some embodiments, a plug is disposed on either the power motor component or the top pulley. In some embodiments, the engine pulley testing device further comprises a gripping component disposed on a bottom end of the first support arm and on a bottom end of the second support arm. In some embodiments, the first end of the third support arm extends past the pivot component and attaches to the brace component.

DESCRIPTION OF PREFERRED EMBODIMENTS

Figure 1:
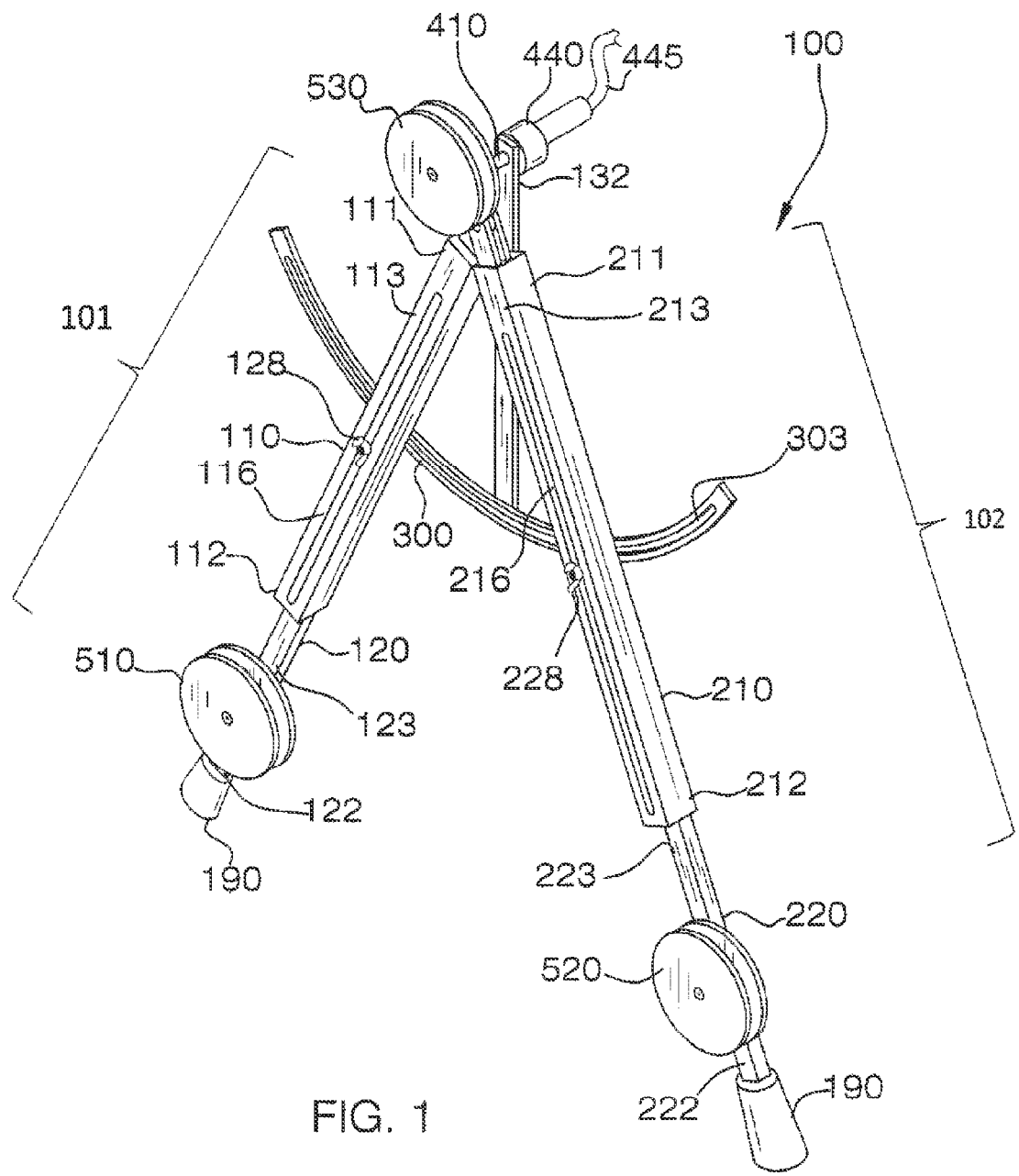
FIG. 1 is a perspective view of the engine pulley testing device of the present invention.

Referring now to FIG. 1-11, the present invention features an engine pulley testing device 100 for allowing a user to detect a damaged engine pulley. The engine pulley testing device 100 comprises a first support arm 101 and a second support arm 102. The first support arm 101 and second support arm 102 both have a first end and a second end. The first end of the first support arm 101 is pivotally attached to the first end of the second support arm 102.

In some embodiments, the first support arm 101 has a first inner post 120 telescopically received in a first outer post 110. The first inner post 120 has a first end 121 and a second end 122, and the first outer post 110 has a first end 111 and a second end 112. In some embodiments, the second support arm 102 has a second inner post 220 telescopically received in a second outer post 210. The second inner post 220 has a first end 221 and a second end 222, and the second outer post 210 has a first end 211 and a second end 212.

The length of the first support arm 101 is adjustable by moving the first inner post 120 in and out of the first outer post 110. Telescopic mechanisms of this nature are well known to one of ordinary skill in the art. In some embodiments, the length of the first support arm 101 is measured from the first end 111 of the first outer post 110 to the second end 122 of the first inner post 120. The length of the first support arm 101 can be locked via a first locking mechanism, for example the first outer post 110 can be secured to the first inner post 120 (or the first inner post 120 can be secured in the first outer post 110).

In some embodiments, the first locking mechanism is a tightening mechanism (e.g., tightening with a lock nut and screw). For example, in some embodiments, a first screw is disposed on the front surface 123 of the first inner post 120 and extends forwardly through a first slot 116 disposed on the front surface 113 of the first outer post 110. As the first inner post 120 slides in and out of the first outer post 110, the first screw slides up and down within the first slot 116. A first look nut 128 may be attached to the first screw (external to the first outer post 110). When the first inner post 120 is in a position of the user's choosing, he/she can turn the first lock nut 128 to tighten the connection between the first inner post 120 and the first outer post 110. Such mechanisms are well known to one of ordinary skill in the art. The first locking mechanism is not limited to the aforementioned examples.

The length of the second support arm 102 is adjustable by moving the second inner post 220 in and out of the second outer post 210. In some embodiments, the length of the second support arm 102 is measured from the first end 121 of the second outer post 210 to the second end 122 of the second inner post 220. The length of the second support arm 102 can be locked via a second locking mechanism, for example the second outer post 210 can be secured to the second inner post 220 (or the second inner post 220 can be secured in the second outer post 210).

In some embodiments, the second locking mechanism a tightening mechanism (e.g., tightening with a lock nut and screw). For example, in some embodiments, a second screw is disposed on the front surface 223 of the second inner post 220 and extends forwardly through a second slot 216 disposed on the front surface 213 of the second outer post 210. As the second inner post 220 slides in and out of the second outer post 210, the second screw slides up and down within the second slot 216. A second lock nut 228 may be attached to the second screw (external to the second outer post 210). When the second inner post 220 is in a position of the user's choosing, he/she can turn the second lock nut 228 to tighten the connection between the second inner post 220 and the second outer post 210. The second locking mechanism is not limited to the aforementioned examples.

Figure 2:
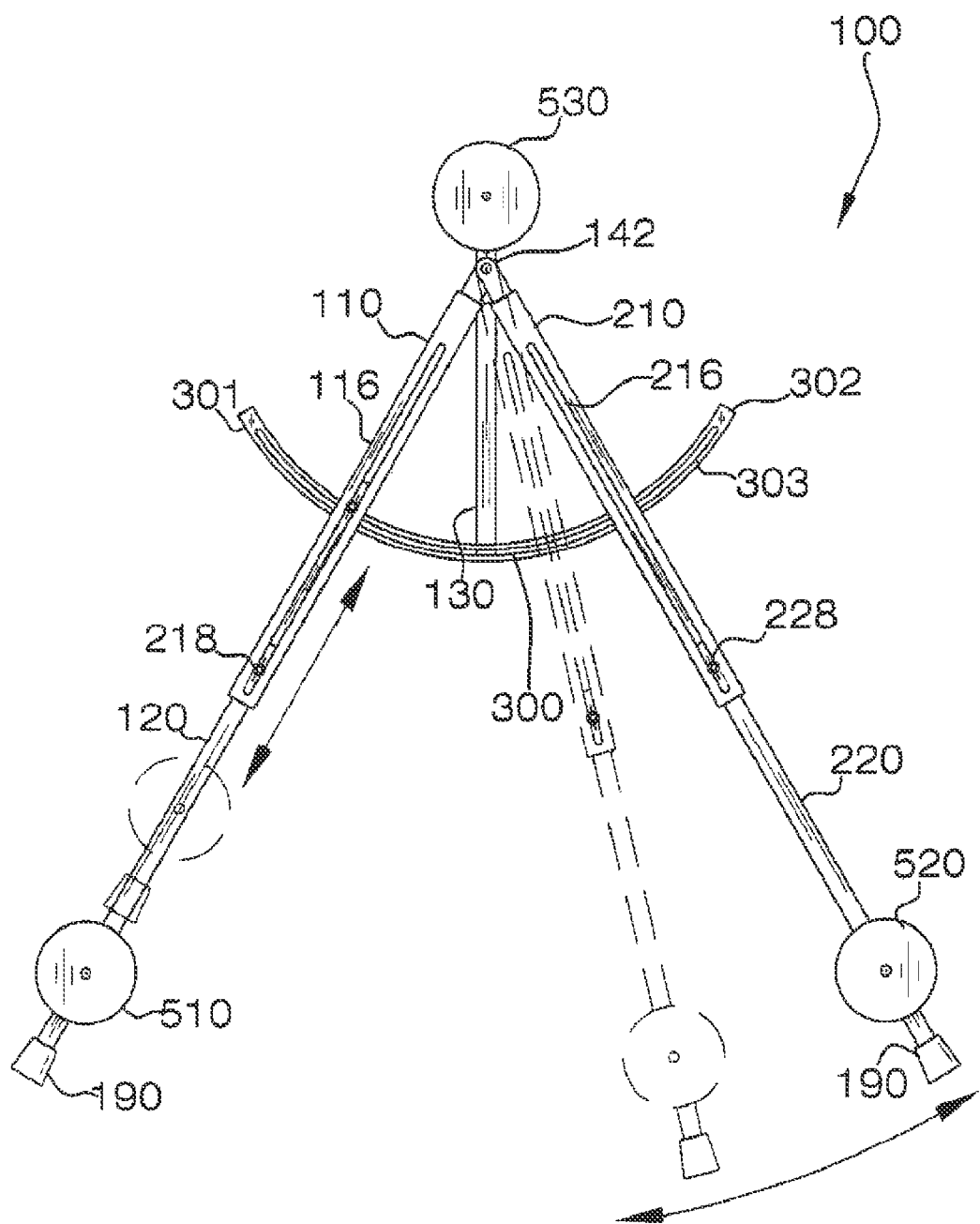
FIG. 2 is a front view of the engine pulley testing device of the present invention.
Figure 3:
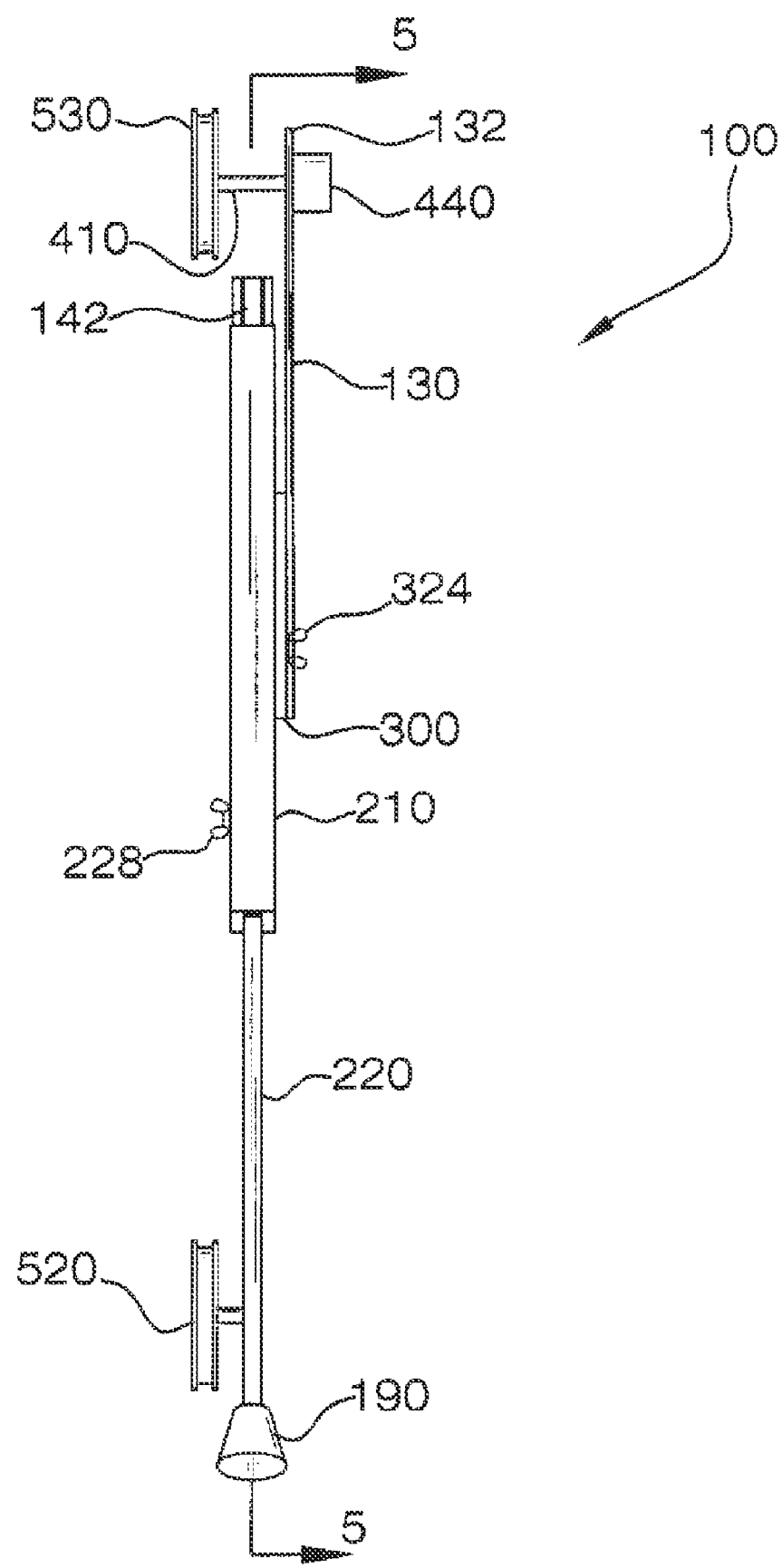
FIG. 3 is a side view of the engine pulley testing device of the present invention.
Figure 4:
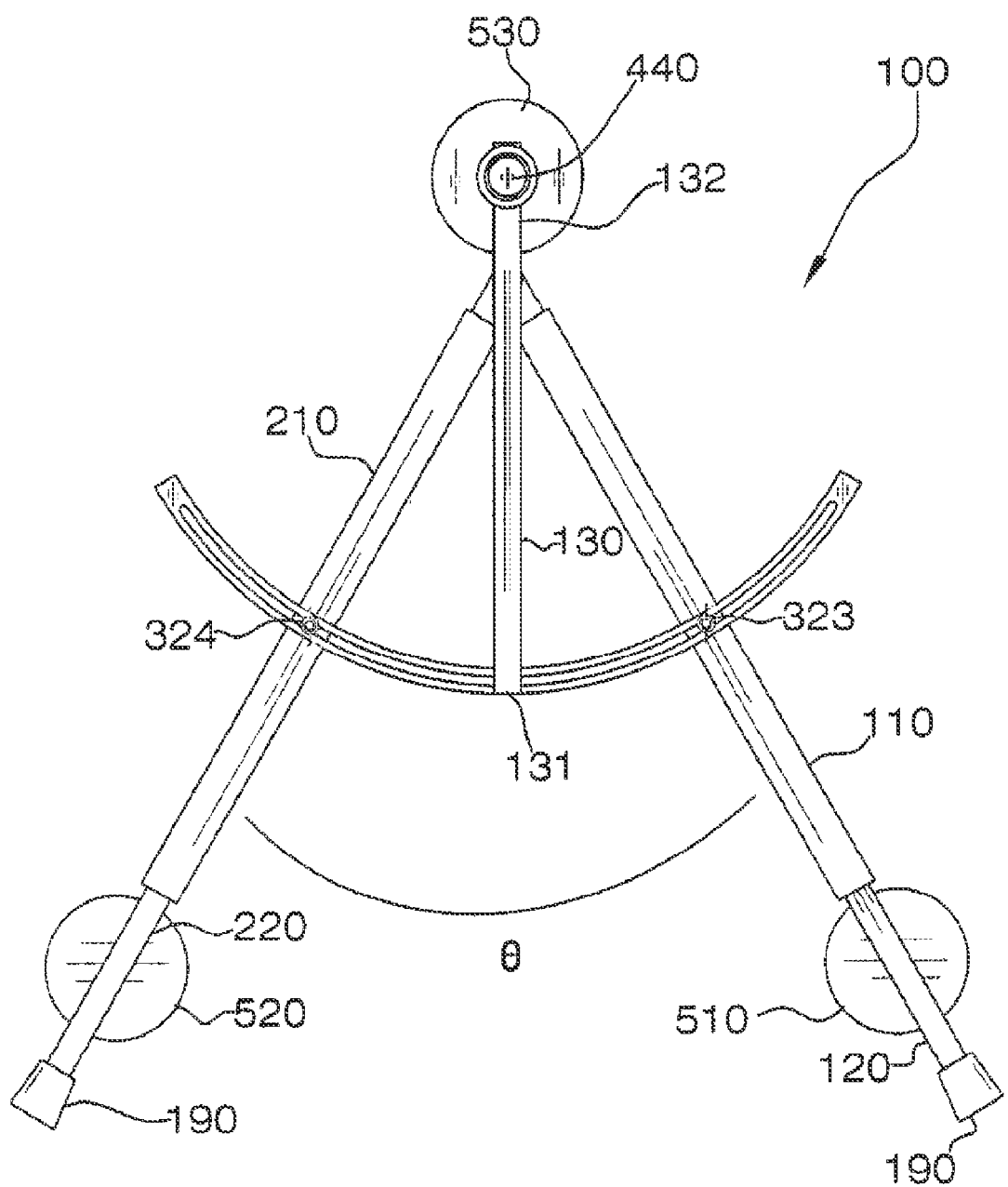
FIG. 4 is a back view of the engine pulley testing device of the present invention.
Figure 5:
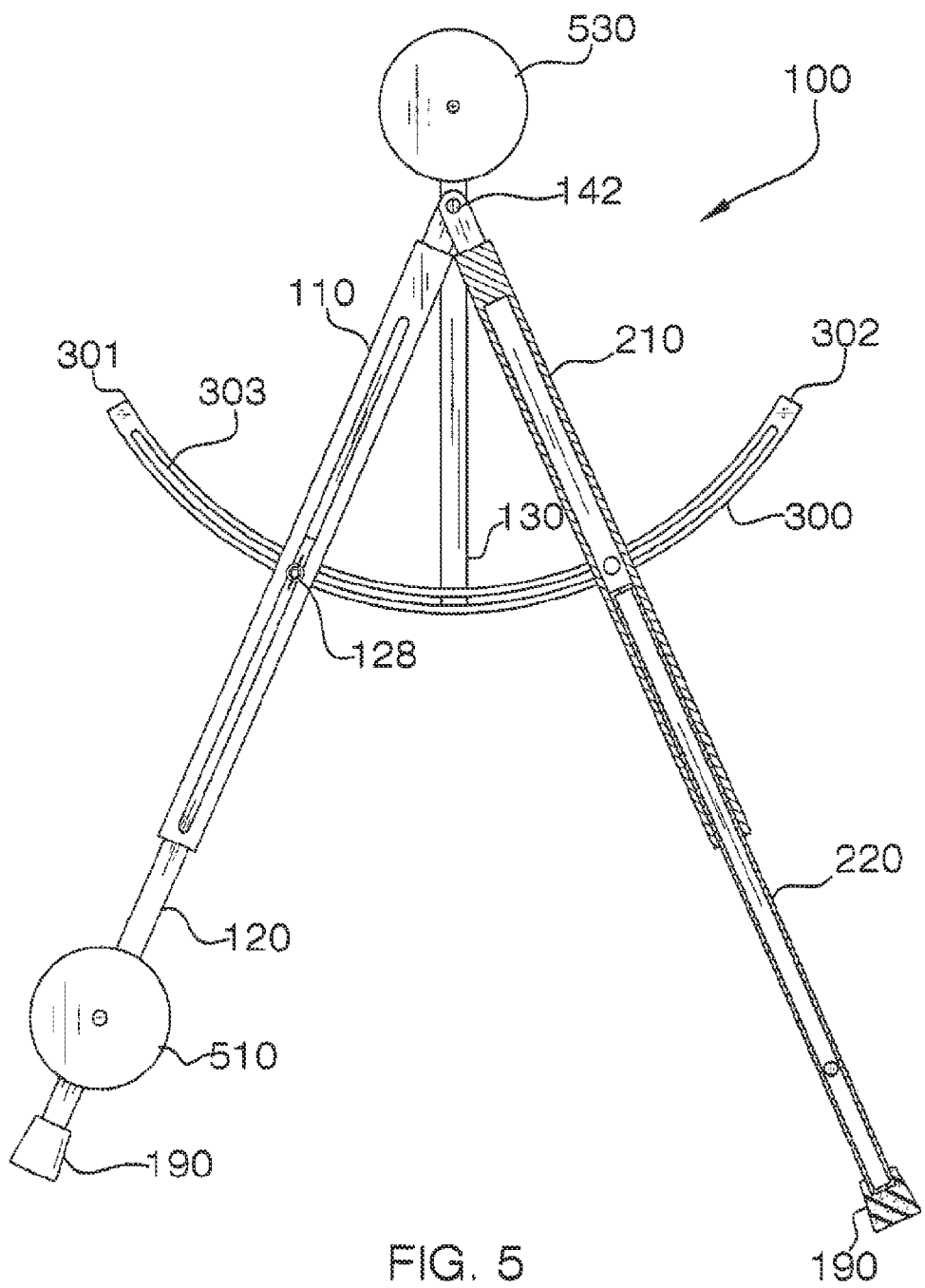
FIG. 5 is a front and cross sectional view of the engine pulley testing device of the present invention.
Figure 6:
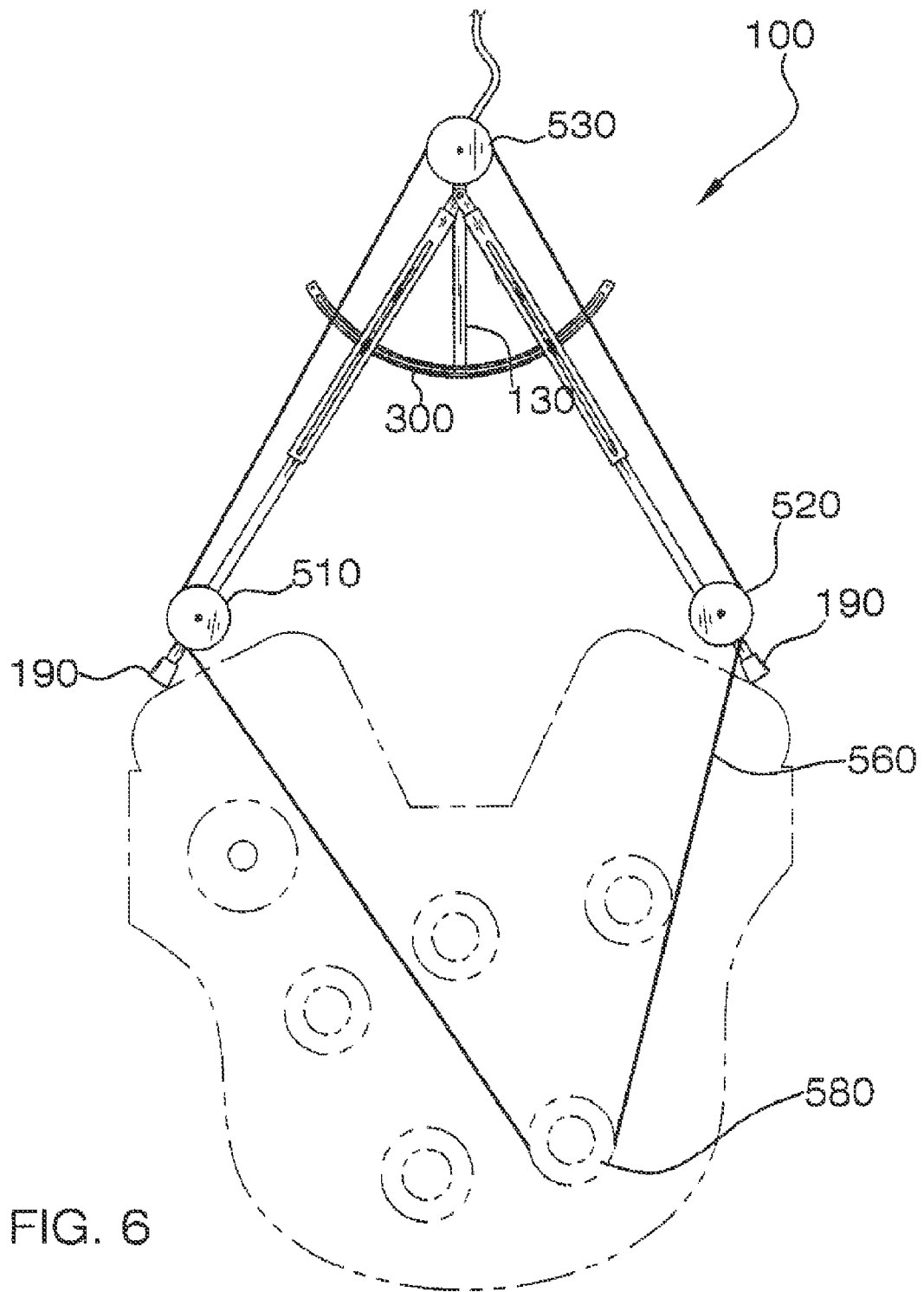
FIG. 6 is a front view of the engine pulley testing device of the present invention as used on engine pulleys.
Figure 7:
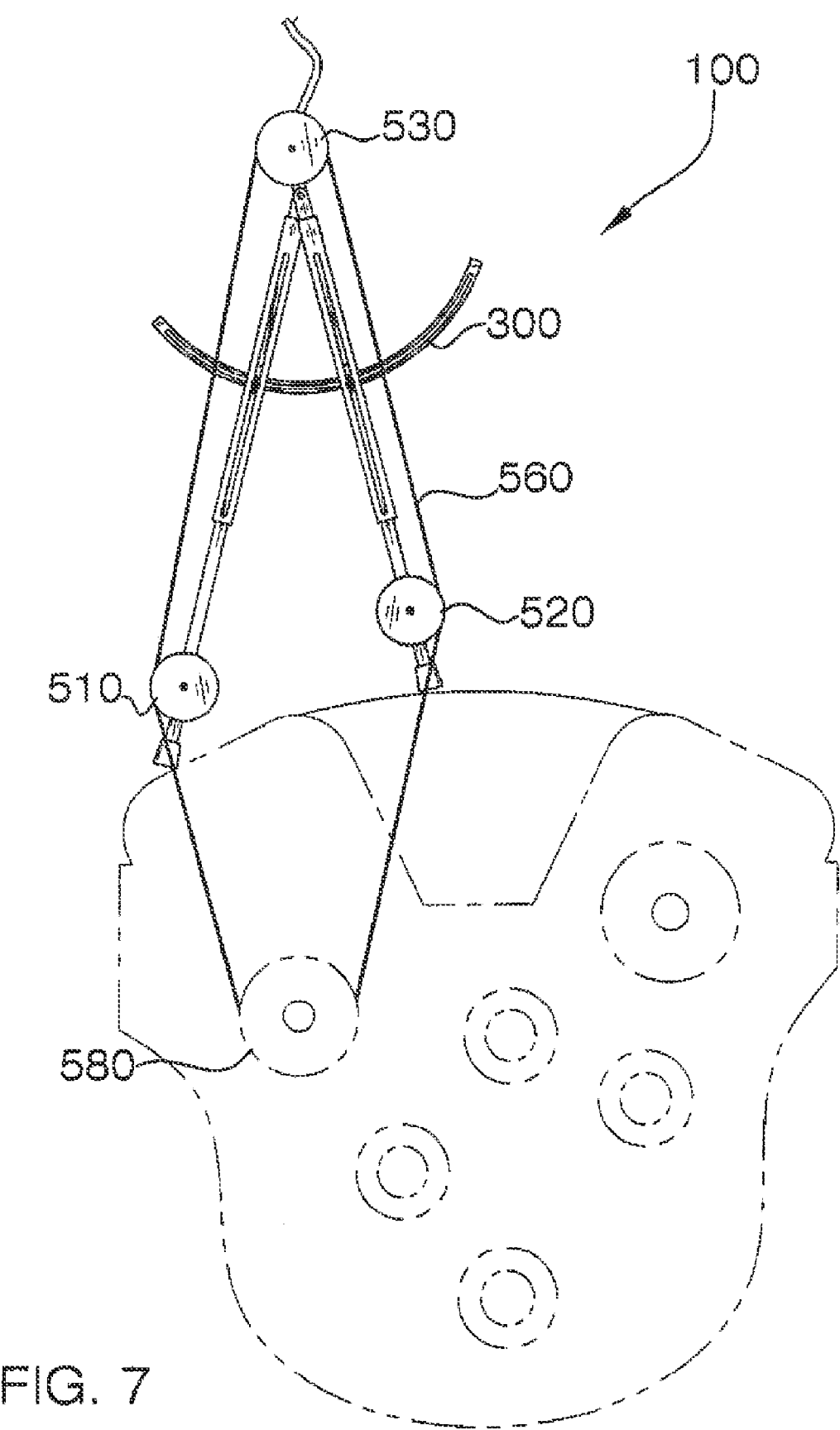
FIG. 7 is a front view of the engine pulley testing device of the present invention as used on engine pulleys.

In some embodiments, for example as shown in FIG. 2, FIG. 3, and FIG. 5, the first end of the first support arm 101 and the first end of the second support arm 102 (e.g., the first end 111 of the first outer post 110 and the first end 211 of the second outer post 210) are pivotally connected/attached via a pivot component 142. In some embodiments, the pivot component 142 is a hinge or a pivot screw. The pivot component 142 allows the first support arm 101 and the second support arm 102 to move closer together or farther away from each other, creating an angle $\theta$ between the two support arms 101, 102 (see FIG. 4). The angle $\theta$ can vary.

The engine pulley testing device 100 of the present invention further comprises a brace component 300 for securing the first support arm and the second support arm a particular distance away from each other (e.g., a particular angle $\theta$). The brace component 300 is optionally arc-shaped, however the brace component 300 is not limited to being arc-shaped and may alternatively be constructed in another shape including but not limited to a straight or generally linear shape. The brace component 300 has a first end 301, a second end 302, and a slot 303 (e.g., a "third slot 303") disposed therein. In some embodiments, the slot 303 extends from at or near the first end 301 to at or near the second end 302. In some embodiments, the slot 303 extends from the front surface of the brace component 300 all the way through to the back surface of the brace component.

The brace component 300 is slidably attached to the first support arm 101 (e.g., the back surface of the first support arm 101, e.g., first outer post 110) and to the second support arm 102 (e.g., the back surface of the second support arm, e.g., second outer post 210). For example, in some embodiments, a third screw is disposed on the back surface of the first support arm 101 (e.g., first outer post 110) and extends through the slot 303 in the brace component 300. In some embodiments, a fourth screw is disposed on the back surface of the second support arm 102 (e.g., second outer post 210) and extends through the third slot 303 in the brace component. The brace component 300 can be secured in a particular position via a third locking means. In some embodiments, the third locking mechanism is a tightening mechanism (e.g., tightening with a lock nut). For example, a third lock nut 323 is attached to the third screw (external to the brace component 300) and a fourth lock nut 324 is attached to the fourth screw. When the first support arm 101 and second support arm 102 are in a particular position of the user's choosing, he/she can turn the third lock nut 323 to tighten the connection between the brace component 300 and the first support arm 101 and turn the fourth lock nut 324 to tighten the connection between the brace component 300 and the second support arm 102.

Optionally, the engine pulley testing device 100 of the present invention further comprises a third support arm 130. The third support arm 130 may help to increase the stability of the device 100 or to help secure the device 100 in place when it is in use. As shown in FIG. 3 and FIG. 4, in some embodiments, the first end 131 of the third support arm 130 is attached to the brace component 300 and the second end 132 of the third support arm 130 extends upwardly past the pivot component 142 to connect to a pulley pole 410, for example the first end of a pulley pole 410 (the pulley pole 410 being oriented above the pivot component 142 as shown in FIG. 3). The pulley pole 410 generally extends forwardly past the first support arm 101 and second support arm 102. In some embodiments, the first end 131 of the third support arm 130 is attached to the brace component 300 and the second end 132 of the third support arm 130 extends upwardly to the pivot component 142.

Figure 10:
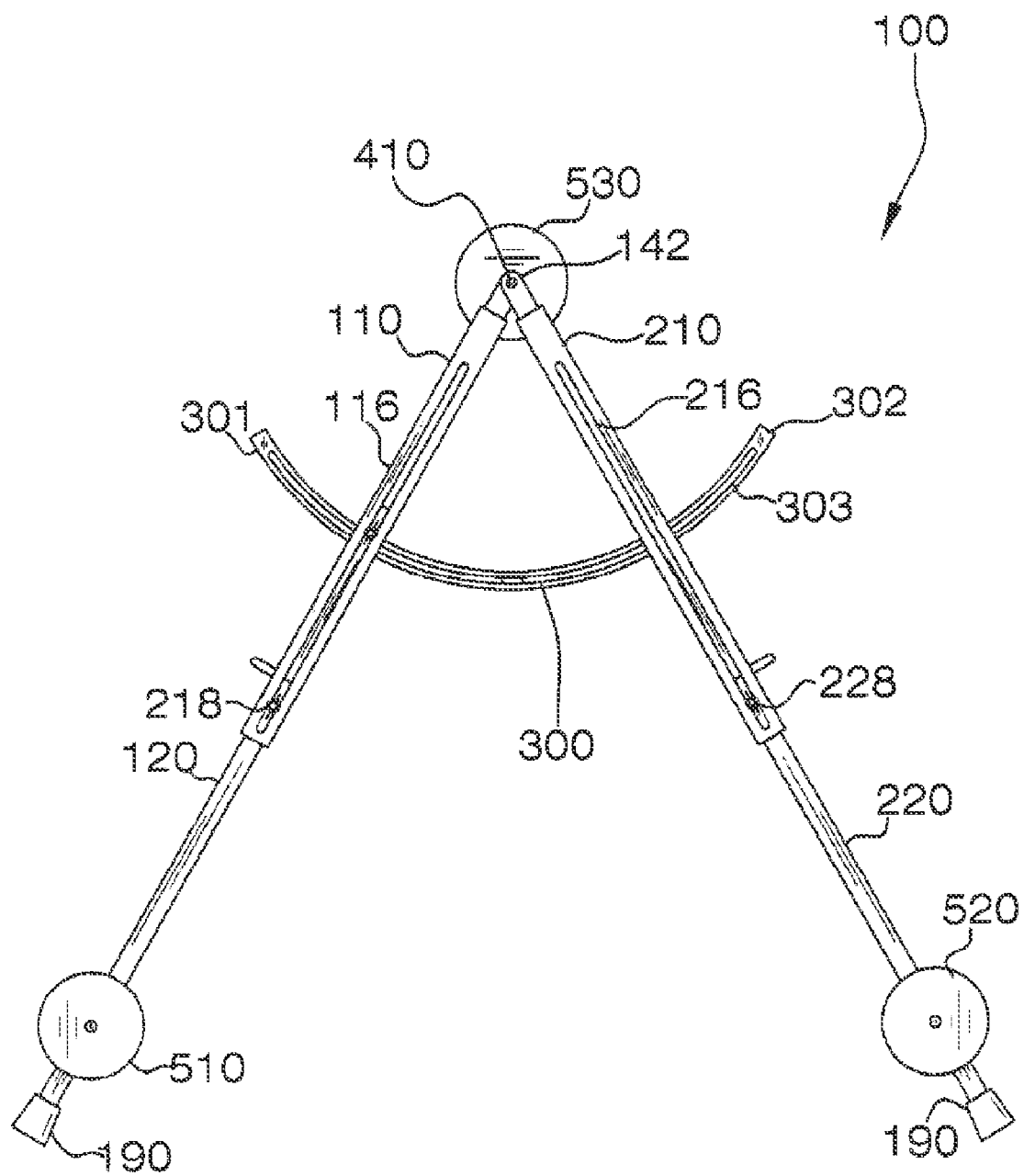
FIG. 10 is a front view of an alternative embodiment of the engine pulley testing device of the present invention.
Figure 11:
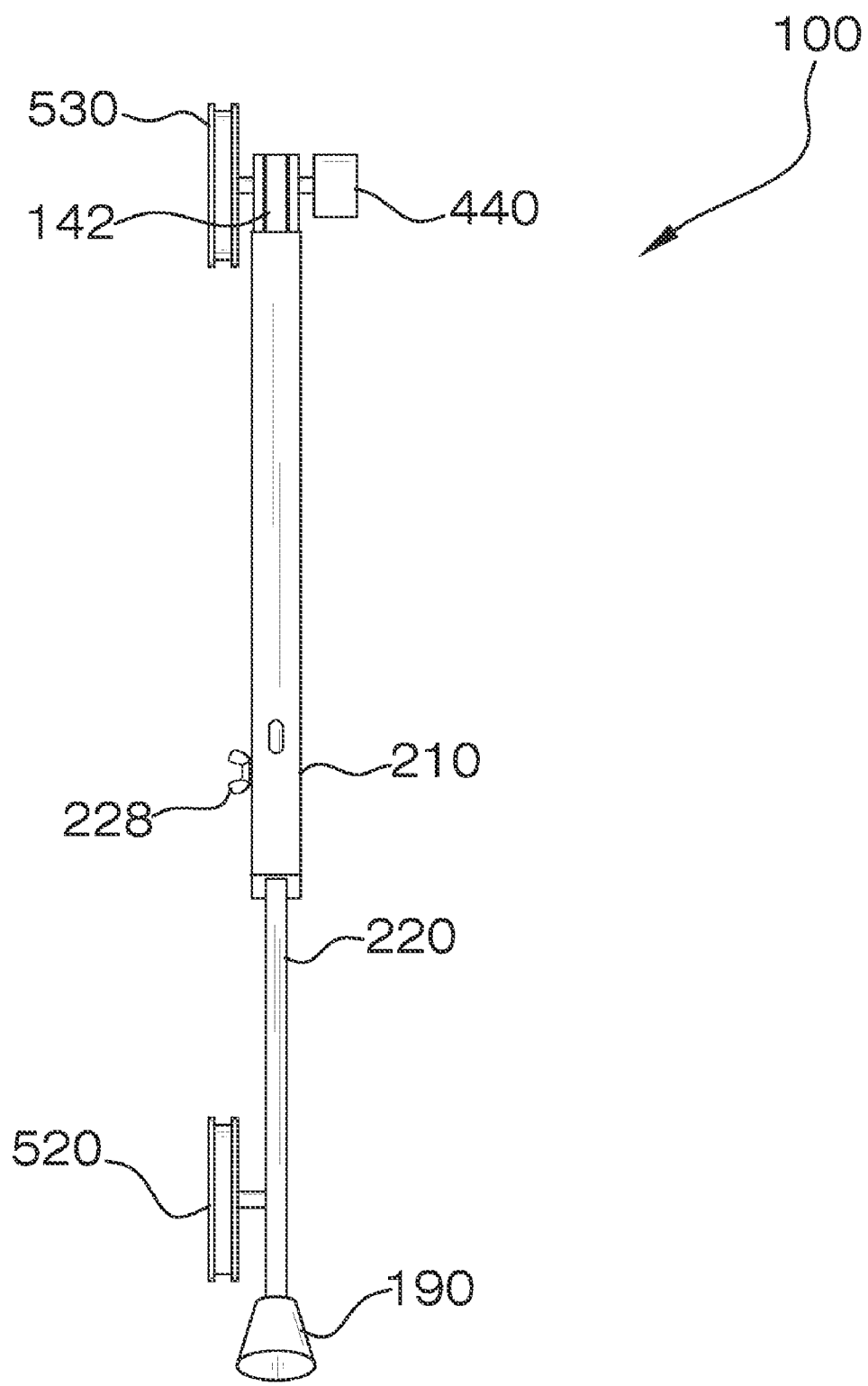
FIG. 11 is a side view of the engine pulley testing device of FIG. 10.
Figure 12:
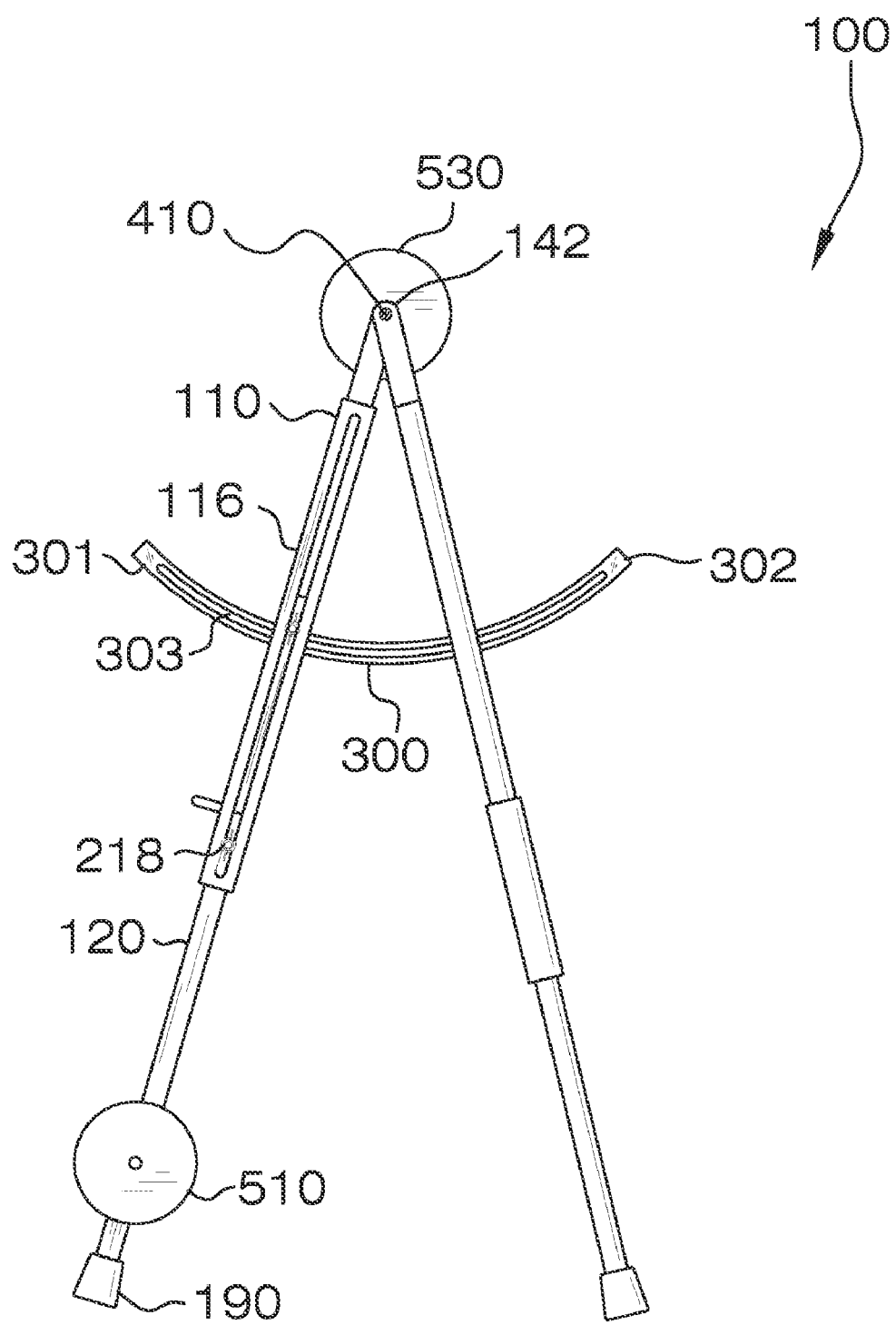
FIG. 12 is an alternative embodiment of the present invention.

As shown in FIG. 10 and FIG. 11, in some embodiments, the pivot component 142 is disposed on the pulley pole 410 and the support arms 101, 102 pivot about the pulley pole 410 via the pivot component 142. The pulley pole 410 generally extends forwardly past the first support arm 101 and second support arm 102.

Figure 8:
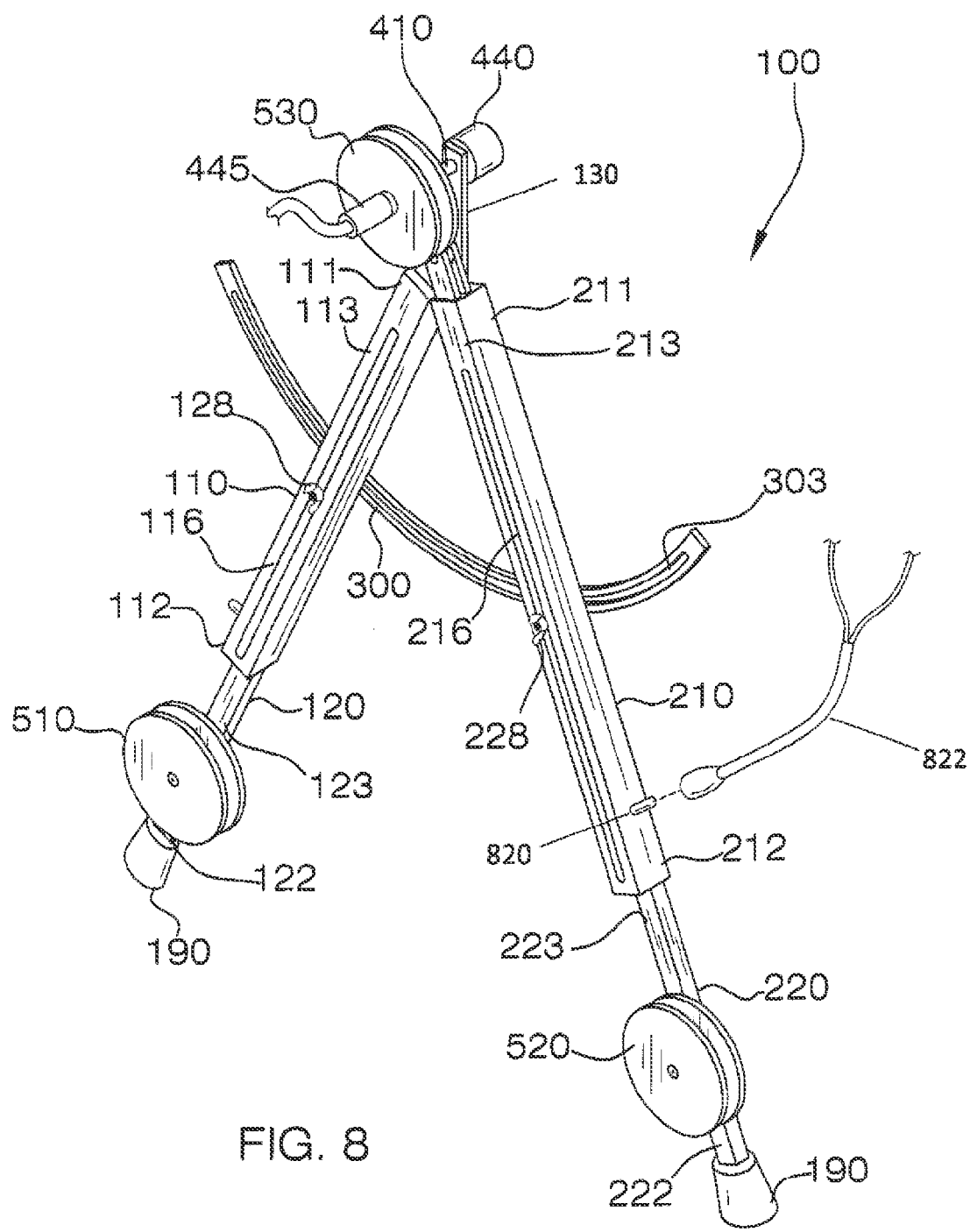
FIG. 8 is a perspective view of an alternative embodiment of the engine pulley testing device of the present invention.
Figure 9:
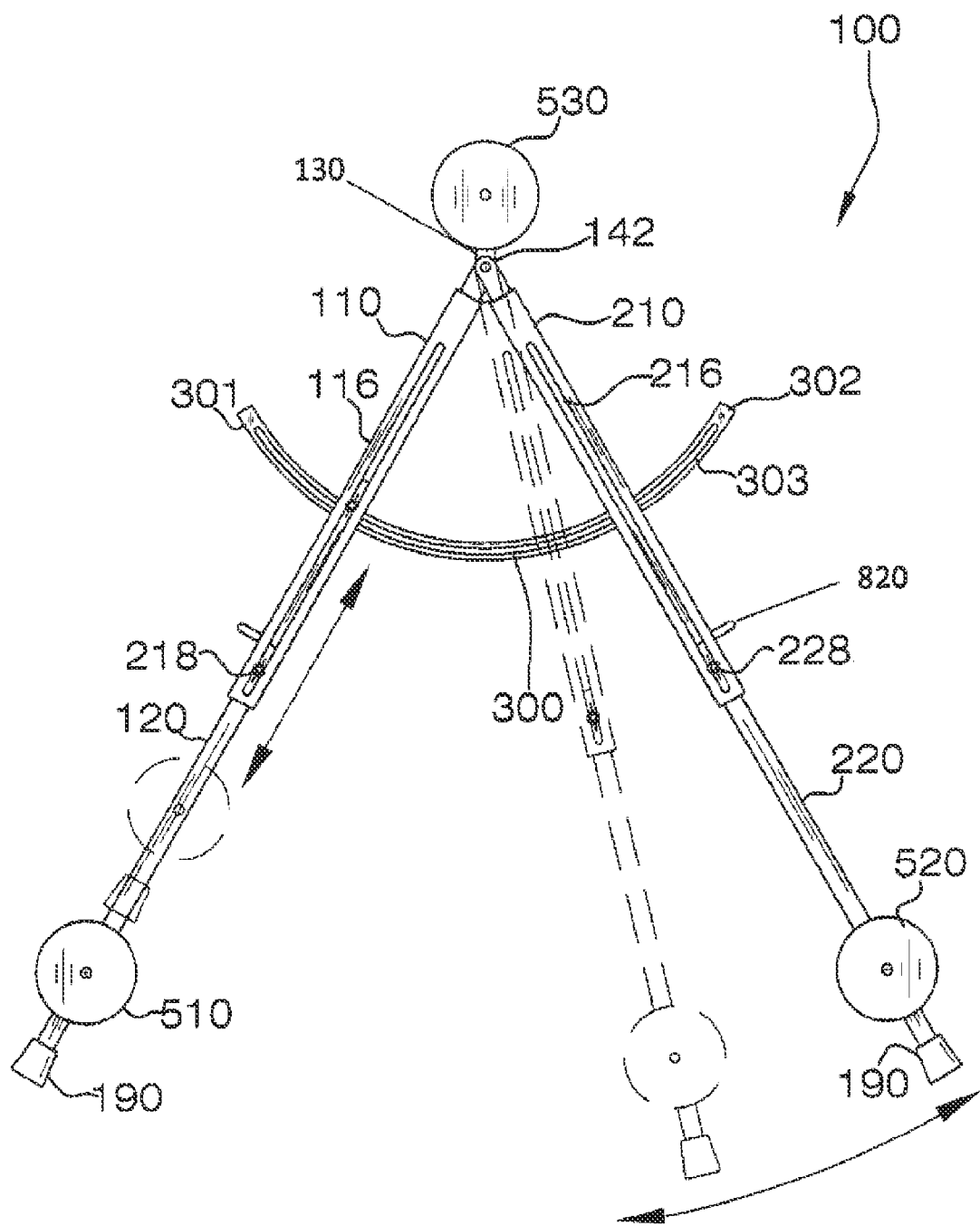
FIG. 9 is a front view of the engine pulley testing device of FIG. 8.

As shown in FIG. 8 and FIG. 9, the third support arm 130 extends only from the pulley pole 410 to the pivot component 142 (and not beyond to the brace component 300).

Attached to the second end of the pulley pole 410 is a top pulley 530. In some embodiments, the top pulley 530 can rotate about the pulley pole 410. In some embodiments, the top pulley 530 can rotate with the pulley pole 410 (e.g., rotating the pulley pole 410 rotates the top pulley 530).

A first bottom pulley 510 is rotatably attached to the first support arm near the second end (e.g., to the front surface 123 of the first inner post 120). A second bottom pulley 520 is rotatably attached to the second support arm near the second end (e.g., to front surface 223 of the second inner post 220). An engine belt 560 can be wrapped around the first bottom pulley 510, the second bottom pulley 520, and/or the top pulley 530. The engine belt 560 can be further wrapped around a test pulley 580 being tested in the engine (see FIG. 6, FIG. 7).

In some embodiments, a power motor component 440 is disposed on the pulley pole 410 (e.g., the end opposite the top pulley 530), or in some embodiments, a power motor component 440 is disposed on the third support arm 130 (e.g., on the second end 132 of the third support arm 130). The power motor component 440 can drive the rotation of the pulley pole 410 and the top pulley 530. The power motor component 440 is operatively connected to a power source (e.g., an electrical outlet, a battery). In some embodiments, the power motor component 440 is operatively connected to an electrical outlet via a plug 445. As shown in FIG. 1, the plug 445 may be connected directly to the power motor component 440. As shown in FIG. 8, in some embodiments, the plug 445 may be alternatively connected to the top pulley 530.

To use the device, a user may place the engine pulley testing device 100 atop the front of an engine. He/she can adjust the support legs and brace 300 as necessary and connect the engine belt 560 to a test pulley 580 in the engine as well as to the top pulley 530 (and the first bottom pulley 510 and second bottom pulley 520). Testing of the pulleys may then begin. Testing pulleys is well known to one of ordinary skill in the art. For example, in some embodiments, the power motor component 440 may be activated to spin the top pulley 530, which causes the engine belt 560 to spin. In some embodiments, the user can listen and/or feel for damage such as a worn pulley or pulley bearings.

In some embodiments, a gripping component 190 is disposed on the second end 122 of the first inner post 120 and on the second end 222 of the second inner post 220. The gripping component 190 can help stabilize the engine pulley testing device when it is in use (e.g., placed atop an engine), for example the gripping component 190 may help to prevent the device 100 from slipping.

As shown in FIG. 8, in some embodiments, a stud 820 (e.g., a short pin, etc.) is disposed on the first support arm 101 or second support arm 102, for example on the second outer post 210 of the second support arm 102. The stud 820 functions to allow engagement of a mechanic's stethoscope 822. Mechanic's stethoscopes 822 are well known to one of ordinary skill in the art. Placement of the stud 820 is not limited to the second support arm 102. For example, in some embodiments, a stud 820 is alternatively (or also) disposed on the first support arm 101.

The disclosures of the following U.S. patents are incorporated in their entirety by reference herein: U.S. Pat. No. 4,235,091; U.S. Pat. No. 5,780,731; U.S. Pat. No. 6,301,978 B1; U.S. Pat. No. 7,246,015 B2; U.S. Pat. No. 3,832,899; U.S. Pat. No. 5,336,993; U.S. Pat. No. 4,480,487; U.S. Pat. No. 5,701,089.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. An engine pulley testing device comprising:
(a) a first support arm 101 and a second support arm 102 pivotally connected via a pivot component 142 such that the first support arm 101 and second support arm 102 can pivot towards and away from each other, wherein a length of the first support arm 101 is adjustable and a length of the second support arm 102 is adjustable;
(b) a brace component 300 connecting the first support arm 101 and second support arm 102, the brace component 300 is temporarily fixed to the first support arm 101 and temporarily fixed to the second support arm 102 via a third locking means, the brace component 300 functions to secure the first support arm 101 and second support arm 102 at an angle theta;
(c) a pulley pole 410 extending through pivot component 142 such that the first support arm 101 and second support arm 102 pivot about the pulley pole 410 via the pivot component 142; and
(d) a top pulley 530 disposed on the pulley pole 410, a first bottom pulley 510 rotatably attached to the first support arm 101, and a second bottom pulley 520 rotatably attached to the second support arm 102, wherein an engine belt 560 can be wrapped around the first bottom pulley 510, the second bottom pulley 520, the top pulley 530, and a test pulley 580 being tested in an engine.

2. The engine pulley testing device of claim 1, wherein the first support arm 101 comprises a first inner post 120 telescopically received in a first outer post 110, wherein the first inner post 120 can be locked in the first outer post 110 via a first locking mechanism.

3. The engine pulley testing device of claim 1, wherein the second support arm 102 comprises a second inner post 220 telescopically received in a second outer post 210, wherein the second inner post 220 can be locked in the second outer post 210 via a second locking mechanism.

4. The engine pulley testing device of claim 1, wherein the brace component 300 is arc-shaped.

5. The engine pulley testing device of claim 1, wherein the brace component 300 has a first end 301 and a second end 302, a slot 303 is disposed therein extending from near the first end 301 of the brace component 300 to near the second end 302 of the brace component 300 and from a front surface of the brace component 300 through to a back surface of the brace component 300, the brace component is slidably attached to the first support arm 101 via a third screw disposed on the first support arm 101 and extending through the slot 303, wherein the brace component 300 is slidably attached to the second support arm 102 via a fourth screw disposed on the second support arm 102 and extending through the slot 303, wherein the third locking means locks the brace component 300 to the first support arm 101 and to the second support arm 102.

6. The engine pulley testing device of claim 1 further comprising a third support arm 130 having a first end 131 and a second end 132, the first end 131 being attached to the brace component 300 and the second end 132 being attached to the pulley pole 410.

7. The engine pulley testing device of claim 1 further comprising a stud 820 disposed on either the first support arm 101 or the second support arm 102, the stud 820 functions to engage a mechanic's stethoscope 822.

8. The engine pulley testing device of claim 1, wherein a power motor component 440 is disposed on the pulley pole 410 for rotating the pulley pole 410 and top pulley 530.

9. The engine pulley testing device of claim 8, wherein a plug 445 is disposed on either the power motor component 440 or the top pulley 530.

10. The engine pulley testing device of claim 1 further comprising a gripping component 190 disposed on a bottom end of the first support arm 101 and on a bottom end of the second support arm 102.

11. An engine pulley testing device comprising:
(a) a first support arm 101 and a second support arm 102 pivotally connected via a pivot component 142 such that the first support arm 101 and second support arm 102 can pivot towards and away from each other, wherein a length of the first support arm 101 is adjustable and a length of the second support arm 102 is adjustable;
(b) a brace component 300 connecting the first support arm 101 and second support arm 102, the brace component 300 is temporarily fixed to the first support arm 101 and temporarily fixed to the second support arm 102 via a third locking means, the brace component 300 functions to secure the first support arm 101 and second support arm 102 at an angle theta;
(c) a third support arm 130 having a first end 131 and a second end 132, the first end 131 being attached to the pivot component 142 and the second end 132 extending upwardly above the pivot component 142;
(d) a pulley pole 410 disposed on the second end 312 of the third support arm 130, the pulley pole 410 being generally perpendicular to the third support arm 130; and
(e) a top pulley 530 disposed on the pulley pole 410, a first bottom pulley 510 rotatably attached to the first support arm 101, and a second bottom pulley 520 rotatably attached to the second support arm 102, wherein an engine belt 560 can be wrapped around the first bottom pulley 510, the second bottom pulley 520, the top pulley 530, and a test pulley 580 being tested in an engine.

12. The engine pulley testing device of claim 11, wherein the first support arm 101 comprises a first inner post 120 telescopically received in a first outer post 110, wherein the first inner post 120 can be looked in the first outer post 110 via a first locking mechanism.

13. The engine pulley testing device of claim 11, wherein the second support arm 102 comprises a second inner post 220 telescopically received in a second outer post 210, wherein the second inner post 220 can be locked in the second outer post 210 via a second locking mechanism.

14. The engine pulley testing device of claim 11, wherein the brace component 300 is arc-shaped.

15. The engine pulley testing device of claim 11, wherein the brace component 300 has a first end 301 and a second end 302, a slot 303 is disposed therein extending from near the first end 301 of the brace component 300 to near the second end 302 of the brace component 300 and from a front surface of the brace component 300 through to a back surface of the brace component 300, the brace component is slidably attached to the first support arm 101 via a third screw disposed on the first support arm 101 and extending through the slot 303, wherein the brace component 300 is slidably attached to the second support arm 102 via a fourth screw disposed on the second support arm 102 and extending through the slot 303, wherein the third locking means locks the brace component 300 to the first support arm 101 and to the second support arm 102.

16. The engine pulley testing device of claim 11 further comprising a stud 820 disposed on either the first support arm 101 or the second support arm 102, the stud 820 functions to engage a mechanic's stethoscope 822.

17. The engine pulley testing device of claim 11, wherein a power motor component 440 is disposed on the pulley pole 410 for rotating the pulley pole 410 and top pulley 530.

18. The engine pulley testing device of claim 17, wherein a plug 445 is disposed on either the power motor component 440 or the top pulley 530.

19. The engine pulley testing device of claim 11 further comprising a gripping component 190 disposed on a bottom end of the first support arm 101 and on a bottom end of the second support arm 102.

20. The engine pulley testing device of cairn 11, wherein the first end 131 of the third support arm 130 extends past the pivot component 142 and attaches to the brace component 300.

* * * * *